United States Patent
Shahverdi et al.

(10) Patent No.: US 11,267,714 B2
(45) Date of Patent: Mar. 8, 2022

(54) SILICA TO HIGH PURITY SILICON PRODUCTION PROCESS

(71) Applicant: PYROGENESIS CANADA INC., Montreal (CA)

(72) Inventors: Ali Shahverdi, Verdun (CA); Pierre Carabin, Montreal (CA)

(73) Assignee: HPQ-SILICON RESOURCES INC., Montreal (CA)

( * ) Notice: Subject to any disclaimer, the term of this patent is extended or adjusted under 35 U.S.C. 154(b) by 289 days.

(21) Appl. No.: 15/750,331

(22) PCT Filed: Aug. 8, 2016

(86) PCT No.: PCT/CA2016/000205
§ 371 (c)(1),
(2) Date: Feb. 5, 2018

(87) PCT Pub. No.: WO2017/024378
PCT Pub. Date: Feb. 16, 2017

(65) Prior Publication Data
US 2018/0237306 A1      Aug. 23, 2018

Related U.S. Application Data

(60) Provisional application No. 62/202,452, filed on Aug. 7, 2015.

(51) Int. Cl.
C01B 33/023    (2006.01)
C01B 33/033    (2006.01)
C01B 33/025    (2006.01)
F27B 3/08      (2006.01)

(52) U.S. Cl.
CPC .......... *C01B 33/033* (2013.01); *C01B 33/023* (2013.01); *C01B 33/025* (2013.01); *F27B 3/08* (2013.01)

(58) Field of Classification Search
CPC ..... C01B 33/00; C01B 33/025; C01B 33/023; C01B 33/033; F27B 9/00; F27B 9/06; F27B 9/042; F27B 9/062; F27B 3/08
See application file for complete search history.

(56) References Cited

U.S. PATENT DOCUMENTS

| 3,215,522 | A | * | 11/1965 | Kuhlmann | ............ | C01B 33/025 75/10.58 |
| 3,393,266 | A | * | 7/1968 | Wynne | .................... | F27D 11/08 373/67 |
| 3,505,460 | A | * | 4/1970 | Bruning | .................... | H05B 7/08 373/90 |
| 5,009,703 | A | * | 4/1991 | Arvidson | ............... | C01B 33/025 75/10.36 |
| 5,104,096 | A | * | 4/1992 | Goins, Jr | ............... | C01B 33/025 266/148 |
| 7,404,941 | B2 | * | 7/2008 | Baluais | .................. | C01B 33/037 423/349 |

* cited by examiner

*Primary Examiner* — Smita S Patel
(74) *Attorney, Agent, or Firm* — Benoit & Côté Inc.; Michel Sofia

(57) ABSTRACT

An apparatus and a process for the production of high purity silicon from silica containing material such as quartz or quartzite, using a vacuum electric arc furnace, are disclosed.

14 Claims, 3 Drawing Sheets

SILICA TO HIGH PURITY SILICON PRODUCTION PROCESS

CROSS REFERENCE TO RELATED APPLICATIONS

This Application claims priority on U.S. Provisional Application No. 62/202,452, filed on Aug. 7, 2015, which is herein incorporated by reference.

FIELD

The present subject-matter relates to the production of silicon and, more particularly, to the production of silicon from silica.

BACKGROUND

One of the main processes for the production of silicon metal is based on the carbothermic reduction of silica at high temperature. This can be achieved by reducing silica in the presence of carbon in an electric arc furnace. The conventional method relies on the direct reduction of silica to silicon at ambient pressure where high temperature arc heats up the reactants to form silicon. The silicon product produced with this method is called Metallurgical Grade Silicon (MG-Si) with purities which are believed to be not greater than 98-99% at best. MG-Si is used directly in the aluminum and steel industry as an additive or is the precursor for production of higher purity grade silicon materials, such as Solar Grade silicon (SoG-Si) and Electronic Grade Silicon (EG-Si). Therefore, higher grade silicon is the product of the lower grade silicon (MG-Si) refined to the higher purity. Refining processes are the post-purification processes via two main routes: chemical route and metallurgical route.

Advances in solar energy and electronic applications have led silicon to become a strategic material in the twenty first century. Therefore, supply of high purity silicon at a reasonable cost has become a need.

The existing conventional carbothermic silicon production process has drawbacks and limitations which include, but are not limited to, high impurity content in the silicon which hinders its direct use in many applications such as solar energy, and high dependency to the raw material purity.

The following techniques are also known.

In U.S. Pat. No. 916,793, issued on Mar. 30, 1909 to Seward et al. and entitled "Production of Silicon", reference [1], an arc furnace is utilized for direct carbothermic reduction of silica to silicon. A twin electrode direct current configuration is used to create the arcs between two cathodes and a bottom anode. Pure coke and substantially pure silica are used for the silicon production. No method has been therein proposed for the removal of either the CO (g) as the main by-product, or the condensed matter which forms during the process. This disclosure covers only a narrow range of the raw materials, those of extreme high purity ("pure").

U.S. Pat. No. 3,215,522, issued on Nov. 2, 1965 to Kuhlmann and entitled "Silicon Metal Production", reference [2], relates to a process for the production of silicon metal and silicon metal-bearing alloys in an electric arc furnace. Similarly to aforementioned U.S. Pat. No. 916,793, carbothermic reduction of silica is therein utilized for the silicon production in an electric arc furnace. The feed material consisting of either or both reactants (i.e. Silica and carbon sources) is fed through a hollow electrode to the furnace. Compared to U.S. Pat. No. 916,793, this disclosure is considered an improvement in which finer feed and less electrode consumption can be achieved. Hollow electrodes are utilized to carry fine-sized reactants into the furnace. Although the fine-sized particles have great tendency to clog in the line, this issue is not addressed in U.S. Pat. No. 3,215,522. Moreover, reactants could clog at the tip of the electrodes where the temperature is high enough to semi melt silica, which increases the chance of clogging. This issue is also not addressed in U.S. Pat. No. 3,215,522. U.S. Pat. No. 5,009,703, issued on Apr. 23, 1991 to Arvidson et al. and entitled "Silicon Smelting Process in Direct Current Furnace", reference [3], targets enhancing the energy consumption of the prior techniques by applying a direct current (DC) in lieu of an alternating current (AC) system and performing the reduction process in a closed configuration of furnace in contrast to the open-top furnace. This disclosure provides a more energy efficient process for producing silicon metal using a DC power source in a closed-top furnace.

U.S. Pat. No. 5,104,096, issued on Apr. 14, 1992 to Goins, Jr. et al. and entitled "Smelting Apparatus for Making Elemental Silicon and Alloys Thereof", reference [4], relates to the electrometallurgical methods and apparatus for the silicon metal production in a substantially pure form. Silicon dioxide is reduced with carbonaceous reductant in an electric arc furnace, wherein part of the silicon dioxide is reduced to silicon metal and part is converted to gaseous oxide. At least a portion of gaseous oxide is collected. By establishing and maintaining countercurrent contact between the collected oxide and a bed of carbonaceous reductant, additional elemental silicon is produced. Gas collection is done through one or more hollow electrodes or one or more drawoff tubes. This injection uses hollow electrodes or drawoff tubes to collect a portion of gaseous oxide, to be SiO (g). Using hollow tubes or electrodes to capture condensable gases is challenging and the chance of clogging is always present. However, in the present disclosure, this issue is not addressed. Although it is indicated that silicon produced by this method will be pure, the issue of impurities accumulation in the silicon phase is not therein addressed.

Therefore, it would be desirable to provide an apparatus and/or a process for producing high purity silicon from silica.

SUMMARY

It would thus be desirable to provide a novel apparatus and/or process for producing silicon from silica.

The embodiments described herein provide in one aspect a system for reducing silica to silicon, which uses a combination of a plasma arc and vacuum, to produce high purity silicon from silica containing materials, such as quartz or quartzite.

Specifically, a vacuum electric arc furnace is provided, such that the plasma arc produces a silicon melt from the silica containing materials.

More specifically, to enhance a volatilization rate of impurities contained in the silica containing materials, volatilizing agents, such as a chlorine containing material, are provided and are adapted to be injected through at least one hollow electrode into a melt produced in the furnace.

Also, the embodiments described herein provide in another aspect a vacuum electric arc furnace, comprising at least one set of hollow electrodes to generate an electric arc.

Specifically, there is provided at least one moving electrode, which is adapted to be displaced by a motion system to control the voltage(s) and which is electrically insulated from a body of furnace.

Furthermore, the embodiments described herein provide in another aspect a process where the reduction process of silica containing materials to high purity silicon takes place in a vacuum arc furnace, the hot gas evolving from the furnace being oxidized in a refractory-lined cyclone used to condense and collect impurities, and to oxidize combustible species, such as carbon monoxide.

Specifically, the gas is further cleaned of condensable particulates in a gas cooler-expander and in a high efficiency particulate air (HEPA) filtration system to capture very fine particulates.

Furthermore, the embodiments described herein provide in another aspect an apparatus for producing silicon from silica, comprising a vacuum electric arc furnace adapted to receive feedstock therein, a vacuum system for providing vacuum in the furnace, wherein a plasma arc created in the furnace is adapted to provide energy to reduce silica to silicon.

Moreover, the embodiments described herein provide in another aspect a process for reducing silica containing materials to silicon, comprising the steps of:
providing a vacuum arc furnace;
feeding silica containing materials into the furnace; and
heating the silica containing materials in the furnace to produce a silicon metal.

BRIEF DESCRIPTION OF THE DRAWINGS

For a better understanding of the embodiments described herein and to show more clearly how they may be carried into effect, reference will now be made, by way of example only, to the accompanying drawings, which show at least one exemplary embodiment, and in which.

DESCRIPTION OF VARIOUS EMBODIMENTS

In an embodiment, a vacuum electric arc furnace (VEAF) is used to produce high purity silicon (e.g., >99%) from silica containing materials in one-step. The arc is created in the vacuum furnace using either alternating current or direct current. The energy needed to reduce silica to silicon is provided by the plasma arc. The reducing agent for such reduction process is typically carbon due to its abundance and low price. Any carbon source with high reactivity with silica that possesses the impurities that mainly volatilize at vacuum condition can be processed. In case of silica containing materials such as quartz, the content of the impurities including, but not limited to, phosphorous (P), Zinc (Zn), Magnesium (Mg), Calcium (Ca), Lead (Pb), Manganese (Mn), Aluminum (Al), and Iron (Fe), can be lowered or totally removed. In the case of the higher vapor pressure species (relative to silicon), the removal rate is higher according to Hertz-Knudsen equation. For instance, P can be almost completely removed by the proposed process.

In the present embodiment, a mixture of silica containing material, for instance quartz, and a reducing agent, typically carbon, is transferred to the VEAF. The plasma arc created in the furnace delivers the necessary energy to reduce silica to silicon and volatilize impurities from the silicon phase under vacuum.

The vacuum electric arc silica reduction functions in a similar way to an electric arc furnace, but using vacuum conditions (<100 kPa, and more typically <1000 Pa) enables to volatilize impurities at lower temperatures and more effectively than they volatilize at atmospheric pressure. This makes it possible to volatilize these impurities at achievable moderate temperatures (1400-2000° C.) and high rate in the furnace with reduced contamination from the crucible. Moreover, those impurities, which are not volatile at ambient pressure such as Mn, Ag, Ga, Sn, Cu, Al, and Fe, become volatile at vacuum conditions. The intense heat from the plasma arc will provide an appropriate temperature for the reduction of silica to silicon in presence of the reducing agent such as carbon and provide enough heat to keep the silicon in molten phase during the refining process. The use of a vacuum electric arc process over an atmospheric electric arc process results in that impurities having higher vapor pressure than silicon will volatilize during the process. This allows for the production of higher purity silicon in one-step in contrast to the conventional method by which the MG-Si is refined through the post-purification processes.

Furthermore, the present embodiment results in that the quality of the silicon product is less dependent on the impurities in the raw materials, compared with known conventional methods. This becomes more important where the high purity silica or the high purity carbon source is unavailable or expensive.

Figure 1:
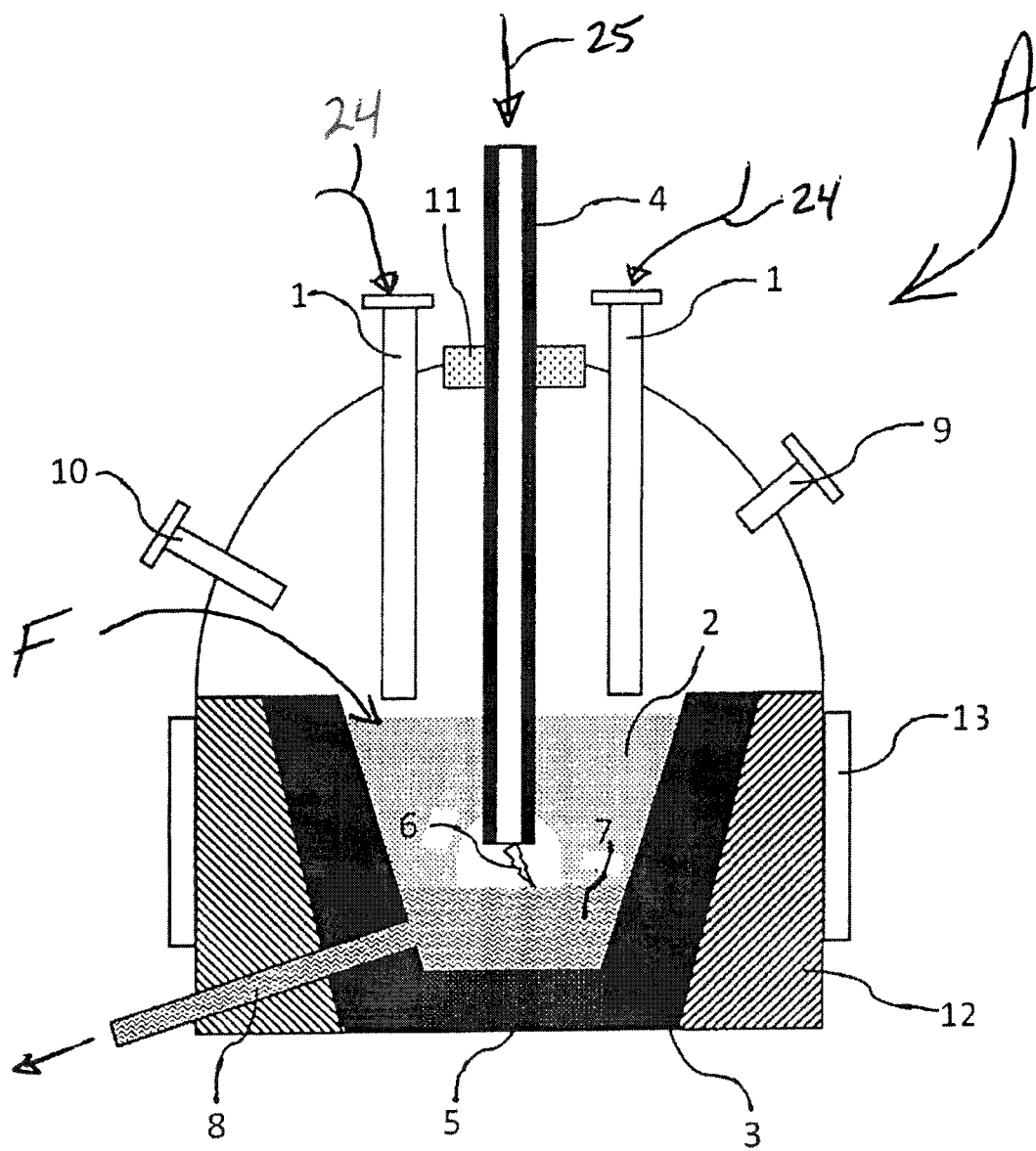
FIG. 1 is a schematic vertical cross-sectional view of a vacuum arc silica to silicon reduction apparatus in accordance with an exemplary embodiment.

Now turning to the drawings, FIG. 1 shows, in a schematic vertical cross-sectional view, a representation of the silica to silicon process in accordance with an exemplary embodiment, wherein reference A denotes generally an apparatus for producing silicon from silica. In the apparatus A, feedstock F is fed at 24 via one or multiple ports 1 to a vacuum electric arc furnace 2 (VEAF), with the feedstock F being piled up in a crucible 3 that is, for instance, made of low conductivity graphite. A moveable hollow graphite electrode(s) 4 carries current to an electrically conductive plate 5 that is, for instance, made of high conductivity graphite. The graphite electrode(s) 4 is hollow to allow at 25 for the introduction of arc stabilizing gases either inert, or reactive and to allow for the introduction of volatilizing chemical agents, those which produce volatile species by reacting with the impurities or enhance the volatilization rate of impurities from the melt.

An electric arc(s) 6 is formed directly between the electrode(s) 4 and the electrically conductive plate 5 at the beginning of the process, and thereby producing a silicon melt 7 thereafter. The melt 7 containing silicon is periodically tapped through a tap hole 8.

The operating pressure of the furnace 2 is regulated through a vacuum pump (not shown) connected to an outlet port 9. The furnace environment is controlled by introducing various gases, to carry over the volatilized impurities and gaseous by-products and to partially oxidize the monoxide gaseous species such as $CO(g)$ and $SiO(g)$ through a gas injection port 10.

The moving electrode(s) 4, which is displaced by a motion system to control the voltage(s) (not shown), is electrically insulated from the body of furnace 2 by electrically insulating material 11, such as machinable glass-ceramic, e.g. MACOR®. To decrease the heat loss of the furnace 2, the wall of the graphite crucible 3 is herein insulated by a low thermal conductive refractory material 12. To control the wall temperature of the furnace 2, a jacket 13 is herein attached to the exterior of the furnace 2, through which a cooling fluid either gas or liquid is introduced (not shown).

Figure 2:
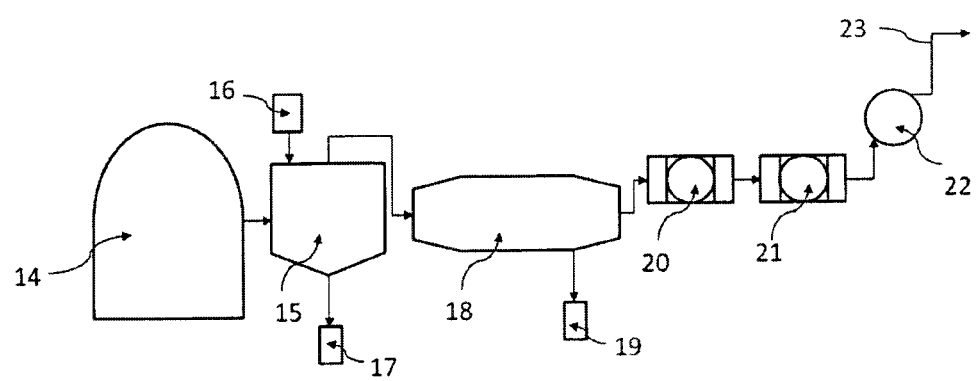
FIG. 2 is a schematic view of a silica to high purity silicon process in accordance with an exemplary embodiment.

FIG. 2 shows a schematic representation of a complete silica to silicon production process in accordance with an exemplary embodiment, which includes a reduction section and a gas cleaning section. The reduction process of silica containing materials to high purity silicon (e.g., >99%) takes place in a furnace 14, such as the detailed furnace 2 described in FIG. 1. The hot gas evolving from the furnace spool mixed with the carrier gas vents off the furnace 14 to an oxygen-assisted refractory-lined cyclone 15. The role of the cyclone 15 is to collect the condensed impurities and silica from the gas phase and to oxidize combustible species, such as carbon monoxide. Air or oxygen is injected into the cyclone 15 through a manifold 16. Alternatively, a refractory-lined vessel fired by a fuel burner or an oxy-fuel burner (not shown) can be used to oxidize $CO(g)$ to $CO_2$ (g) in the off-gas. The condensates and the carryover particulates are collected in a sealed collection pot 17.

The gas coming out of the cyclone 15 passes through a gas cooler-expander 18, where the gas is cooled down to reach temperatures below 80° C., and the particulates, from the condensates that are volatile in the cyclone 15, settle down and are collected in a collection box 19. The gas coming out of the gas cooler-expander 18 will pass through a high efficiency particulate air (HEPA) filtration system 20 to capture very fine particulates, e.g. <5 µm, escaping from the cyclone 15 and the gas cooler-expander 18. The gas, free of particulates, will pass through an activated carbon filter 21 to capture remaining noxious gaseous species such as $Cl_2$, other chlorine containing gaseous species, $SO_2$, and other acid gases from the off-gas. The operating pressure of the system is controlled by a vacuum pump 22. The off-gas is exhausted to a stack 23.

Returning to FIG. 1, the feedstock material F containing silica, which is either quartz or quartzite or any other forms with high silica content (>60-70%, the remaining to be mostly volatile impurities at the VEAF operating condition), and a reducing agent, which is typically carbon, is fed directly into the VEAF 2. The hollow electrode(s) 4, typically made of high quality graphite, conducts the current to the conductive plate 5 placed at the bottom of the furnace 2 through direct contact at the beginning of the process and thereafter, the plasma arc 6. The plasma arc 6 heats up the feedstock F to initiate the reduction reactions via $SiO_2(s, l)+C(s)$.

Gaseous by-product, in case of using carbon to be carbon monoxide (CO) via this overall reaction: $SiO_2(s)+2C(s)+Heat=Si (l)+2CO (g)$, travels up and is vented out to an appropriate gas cleaning system as shown in FIG. 2. The gas cleaning system role is, for instance, to reduce the level of $CO(g)$ below 50 ppm in the off-gas, to remove the noxious gaseous species, and to capture particulates from the gas coming out of the furnace 2. The silicon in liquid form is accumulated at the bottom of the crucible 3 and is periodically tapped out, at 8, from the furnace 2. Each tapping typically takes place between each reduction-refining process and depends on the removal rate of the impurities under vacuum condition. The heat from the arc 6 keeps the silicon and impurities in the molten phase. A very low operating pressure is provided for the volatilization of the impurities having higher vapor pressure than silicon.

The volatized impurities are vented out of the furnace 2 via an inert gas (such as Argon) or a reducing carrier gas (such as CO). To enhance the volatilization rate of the impurities, various volatilizing agents, such as chlorine containing material, can be injected through the hollow electrode(s) 4 into the melt 7. The volatilizing agents enhance the volatilization rate of impurities by reacting with them and producing new compound(s) with a greater volatility and/or by becoming volatile in the melt. For instance, by injecting chlorine ($Cl_2$), impurities will be transformed to the metal salts, via $M(l)+x/2\ Cl_2(g)=MCl_x(g)$, having much higher volatility than their metal form. The amount of volatilizing gas to be injected varies according to the amount of impurities and should be injected according to the stoichiometry of the reactions.

EXAMPLE

The difference in the vapor pressures of the metal components at elevated temperatures is the basic principle of the vacuum refining. The vapor pressures of selected pure substances between 1400° C. and 2000° C. were calculated using the available vapor pressure data of pure substances (shown in FIG. 3). It is seen that the vapor pressures of many elements which exist in the starting material (e.g. Quartz) are higher than that of silicon, and hence, they can be evaporated from the silicon phase. However, at atmospheric pressure (i.e., 1.013 E+05 Pa), only a few elements can be evaporated at temperatures around 2000° C., which is the temperature of the crater, i.e. the cavity which is created in the furnace burden by the formation of gaseous species from the raw materials, where the silicon metal accumulates.

Figure 3:
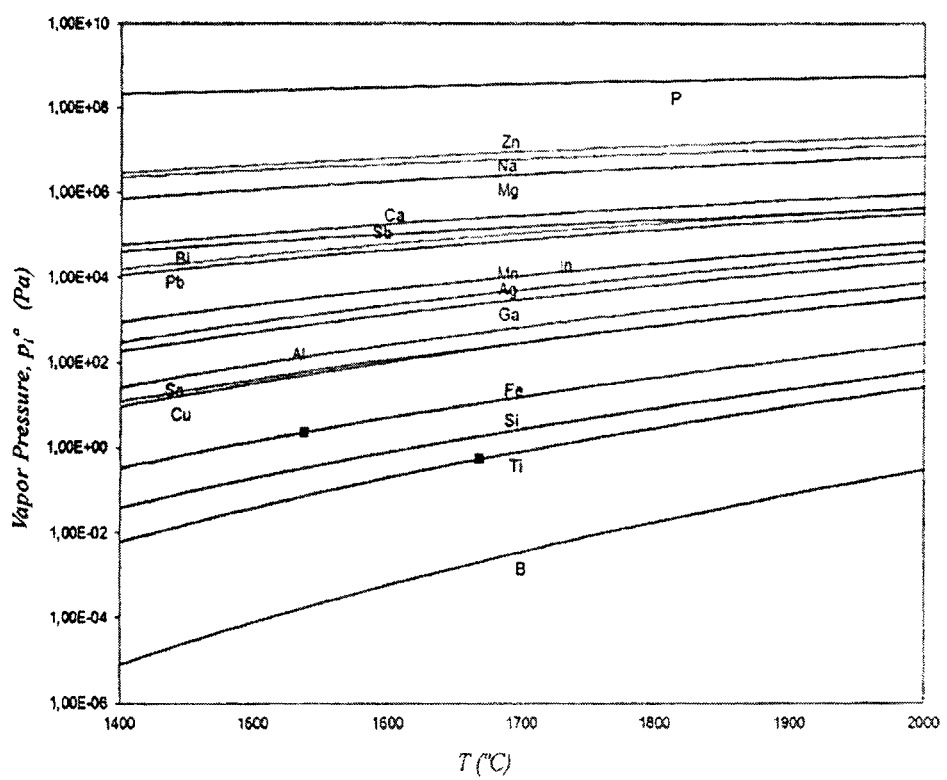
FIG. 3 is a graph of a vapor pressure of pure metal elements as a function of temperature in accordance with an exemplary embodiment.

On the other hand, by reducing the operating pressure of the process, e.g. to 100 Pa, all elements above the silicon line as shown in FIG. 3 will be evaporated at a temperature as low as 1900° C. Moreover, lowering the pressure will also help to perform the refining process at lower temperatures, which will lower the operating cost of the process. Additionally, vacuum refining enhances the mass transfer of volatile impurities from the liquid to the gas phase by reducing the resistance at the liquid-gas interface, which cannot be achieved at atmospheric pressure.

In one example, quartz raw material was reduced in the presence of carbon in the direct electric (DC) vacuum arc furnace operating at vacuum level of <0.5 kPa. The bottom of graphite crucible acted as the bottom anode to receive electrode from the cathode. The process was performed in the batch mode where quartz-carbon mixture (a mass ratio of 2.5 $SiO_2/C$) was placed in the graphite crucible. Quartz sample had a purity of 98.99% and the carbon source metal impurity was assessed by ICP-MS to be 0.4%. The presence of silicon metal was detected in the produced sample collected from the bottom of crucible using scanning electron microscopy coupled with energy dispersive X-ray spectroscopy (SEM-EXD) method. The silicon phase purity was then quantified with a detection limit of 0.1% (1000 ppm). In one sample 22 readings showed the presence of 100% pure silicon metal with actual purity of greater than 99.9% with respect to the detection limit. In this example, 1% of impurity was present in the quartz sample while the carbon source contained 0.4% of metal impurities. The presence of silicon metal with purity greater than 99.9% indicates that not only silicon can be produced using this novel method but also this purity can be achieved in one step.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

REFERENCES

[1] G. O. Seward and F. O. Kügelgen, "Production of Silicon". U.S. Pat. No. 916,793, 30 Mar. 1909.

[2] A. M. Kuhlmann, "Silicon Metal Production". U.S. Pat. No. 3,215,522, 2 Nov. 1965.

[3] Arvid N. Arvidson, Vishu D. Dosaj and James B. May, "Silicon Smelting Process in Direct Current Furnace". U.S. Pat. No. 5,009,703, 23 Apr. 1991.

[4] Curtis W. Goins Jr. and Earl K. Stanley, "Smelting Apparatus for Making Elemental Silicon and Alloys Thereof". U.S. Pat. No. 5,104,096, 14 Apr. 1992.

The invention claimed is:

1. An apparatus for producing silicon from silica, comprising:
   a vacuum electric arc furnace receive a feedstock,
   a vacuum system for providing a vacuum in the vacuum electric arc furnace,
   a plasma arc is created in the vacuum electric arc furnace which provides energy to reduce silica to silicon,
   at least one moveable hollow electrode provided for carrying current to an electrically conductive plate provided in the vacuum electric arc furnace,
   an electric arc forming directly between the moveable hollow electrode and the electrically conductive plate at a beginning of producing the silicon from the silica, thereby producing a silicon melt wherein the silicon melt contains the silicon,
   wherein the moveable hollow electrode allows for an introduction of (1) arc stabilizing gases in the vacuum electric arc furnace and (2) various volatilizing chemical agents, which produce volatile species by reacting with impurities and enhance a volatilization rate of impurities from the silicon melt,
   wherein to enhance the volatilization rate of the impurities, the various volatilizing chemical agents are provided for injection through the moveable hollow electrode into the silicon melt,
   wherein the volatilizing chemical agents are provided for enhancing the volatilization rate of the impurities by reacting with the impurities producing at least one new compound with a greater volatility and/or by becoming volatile in the silicon melt.

2. The apparatus of claim 1, wherein the vacuum electric arc furnace includes a crucible, the feedstock being fed to the crucible via at least one feedstock port.

3. The apparatus of claim 1, wherein the electrically conductive plate is provided at a bottom of the vacuum electric arc furnace.

4. The apparatus of claim 3, wherein a tap hole is provided for periodically tapping the silicon melt, in a liquid form, from the vacuum electric arc furnace.

5. The apparatus of claim 3, the moveable hollow electrode conducts current to the electrically conductive plate placed at the bottom of the vacuum electric arc furnace through direct contact at the beginning of producing the silicon from the silica and thereafter, the plasma arc heats up the feedstock to initiate reduction reactions.

6. The apparatus of claim 1, wherein the vacuum electric arc furnace is controlled by introducing various gases via a gas injection port for carrying over volatilized impurities and gaseous by-products and for partially oxidizing monoxide gaseous species.

7. The apparatus of claim 1, wherein the feedstock material contains a silica, which is either quartz or quartzite or any other forms with a high silica content, and with a reducing agent fed directly into the vacuum electric arc furnace.

8. The apparatus of claim 1, wherein a low operating pressure provides for a volatilization of impurities having higher vapor pressure than silicon in the vacuum electric arc furnace.

9. The apparatus of claim 8, wherein the volatized impurities are vented out of the vacuum electric arc furnace via at least one of an inert gas and a reducing carrier gas.

10. The apparatus of claim 9, wherein the inert gas includes argon, and the reducing carrier gas includes carbon monoxide (CO).

11. The apparatus of claim 1, wherein the vacuum is provided by a vacuum pump in communication with the vacuum electric arc furnace.

12. The apparatus of claim 11, wherein an operating pressure of the vacuum electric arc furnace is regulated with the vacuum pump.

13. The apparatus of claim 1, wherein the various volatilizing chemical agents comprise chlorine, wherein the chlorine ($Cl_2$) is injected through the moveable hollow electrode, wherein the impurities are transformed to metal salts.

14. The apparatus of claim 1, wherein the moveable hollow electrode is displaced by a motion system to control a voltage.

* * * * *